United States Patent
You et al.

(10) Patent No.: US 12,237,670 B2
(45) Date of Patent: Feb. 25, 2025

(54) SOFT-START PROTECTION CIRCUIT AND CIRCUIT PROTECTION INTEGRATED CHIP

(71) Applicant: INSPUR ELECTRONIC INFORMATION INDUSTRY CO., LTD., Shandong (CN)

(72) Inventors: Huijie You, Shandong (CN); Yan Li, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 172 days.

(21) Appl. No.: 18/246,296

(22) PCT Filed: Jul. 30, 2021

(86) PCT No.: PCT/CN2021/109437
§ 371 (c)(1),
(2) Date: Mar. 22, 2023

(87) PCT Pub. No.: WO2022/078008
PCT Pub. Date: Apr. 21, 2022

(65) Prior Publication Data
US 2023/0378748 A1 Nov. 23, 2023

(30) Foreign Application Priority Data

Oct. 16, 2020 (CN) .......................... 202011109469.0

(51) Int. Cl.
*H02H 9/00* (2006.01)
*H02H 9/02* (2006.01)
(52) U.S. Cl.
CPC ............ *H02H 9/001* (2013.01); *H02H 9/025* (2013.01)
(58) Field of Classification Search
CPC ......... H02H 9/004; H02H 9/025; H02H 9/001
(Continued)

(56) References Cited

U.S. PATENT DOCUMENTS

| 10,343,879 B1 | 7/2019 | Motoalliance | |
|---|---|---|---|
| 2011/0075307 A1* | 3/2011 | Murota | H02H 3/093 361/57 |
| 2016/0156302 A1* | 6/2016 | Asai | H02P 27/08 318/255 |

FOREIGN PATENT DOCUMENTS

| CN | 1219816 A | 6/1999 |
|---|---|---|
| CN | 106134500 B | 10/2012 |

(Continued)

OTHER PUBLICATIONS

Machine translation of Liu et al. Chinese Patent Document CN 205545180 U Aug. 2016 (Year: 2016).*

(Continued)

*Primary Examiner* — Kevin J Comber
(74) *Attorney, Agent, or Firm* — Dennemeyer & Associates LLC

(57) ABSTRACT

The present disclosure discloses a soft-start protection circuit, comprising: a protection chip, a first switch tube, a second switch tube, a third switch tube, a fourth switch tube, a first capacitor, a first resistor, a second resistor, a third resistor, a fourth resistor, a fifth resistor, a sixth resistor and a seventh resistor. In the soft-start protection circuit of the present disclosure, the voltage of a voltage input end and the control end voltage of the first switch tube may be monitored; therefore, when there is a change in the two voltages, correct turn-on and turn-off actions may be performed in the soft-start protection circuit, increasing the accuracy of protection and at the same time reducing the turn-on speed of switch tubes to a certain extent, thus effectively reducing the impact of an impulse current on components and systems. Correspondingly, the present disclosure further discloses a circuit protection integrated chip.

16 Claims, 1 Drawing Sheet

(58) Field of Classification Search
USPC .......................................................... 361/57
See application file for complete search history.

(56) References Cited

FOREIGN PATENT DOCUMENTS

| CN | 202841092 U | | 3/2013 | |
|----|-------------|---|--------|---|
| CN | 205407576 U | | 7/2016 | |
| CN | 205545180 U | * | 8/2016 | |
| CN | 108400702 A | * | 8/2018 | ........... H02H 7/1213 |
| CN | 108574263 A | * | 9/2018 | |
| CN | 208421192 U | * | 1/2019 | |
| CN | 112310937 A | | 2/2021 | |

OTHER PUBLICATIONS

Machine translation of Li. Chinese Patent Document CN 108400702 A Aug. 2018 (Year: 2018).*
Machine translation of Yang Chinese Patent Document CN 108574263 A Sep. 2018 (Year: 2018).*
Machine translation of Yang Chinese Patent Document CN 208421192 U Jan. 2019 (Year: 2019).*
Search report for PCT/CN2021/109437 mailed on Sep. 14, 2021.
Search report 1 and 2 for Chinese application 202011109469.0, filed Oct. 16, 2020.

* cited by examiner

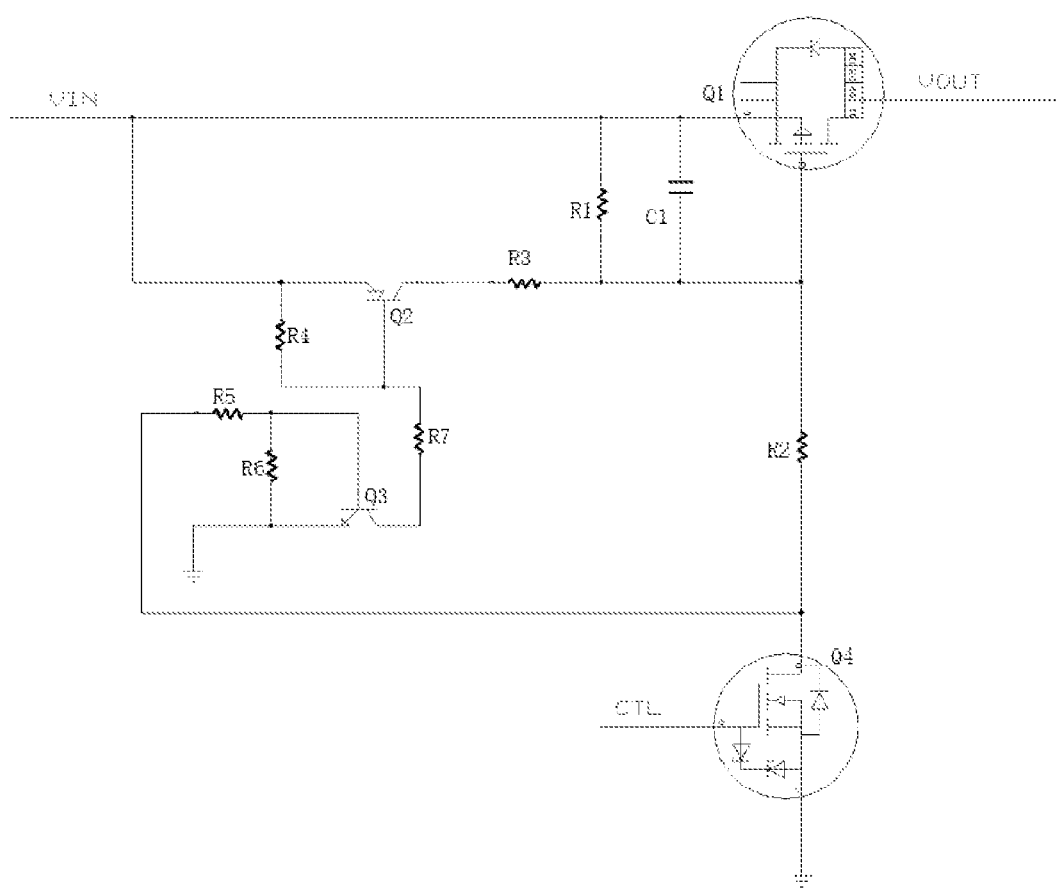

SOFT-START PROTECTION CIRCUIT AND CIRCUIT PROTECTION INTEGRATED CHIP

CROSS-REFERENCE TO RELATED APPLICATIONS

This is a 35 U.S.C. 371 National Stage Patent Application of International Application No. PCT/CN2021/109437, filed Jul. 30, 2021, which claims priority to Chinese application 202011109469.0, filed Oct. 16, 2020, each of which is hereby incorporated by reference in its entirety.

TECHNICAL FIELD

The present disclosure relates to the field of server circuit protection, and in particular, to a soft-start protection circuit and a circuit protection integrated chip.

BACKGROUND

With the increasing requirement for reliability of servers and desktop devices, there is a need to support hot plugging between the adapter and the main board of the power supply. In order to stabilize the power supply of the main board, the capacity of the capacitor will be increased at the input end, and a large surge current will occur in the process of hot plugging, which tends to cause instability of a bus voltage and damage to components, resulting in failure of a circuit.

In existing soft-start schemes, the climbing time of a gate voltage of an MOS transistor is generally controlled by means of RC delay and voltage stabilization, so that the MOS transistor is slowly turned on to achieve the effect of reducing an impulse current. However, this scheme has a risk of mis-operation to some extent.

SUMMARY

A soft-start protection circuit, comprising a protection chip, a first switch tube, a second switch tube, a third switch tube, a fourth switch tube, a first capacitor, a first resistor, a second resistor, a third resistor, a fourth resistor, a fifth resistor, a sixth resistor and a seventh resistor, wherein
the first switch tube has a first end connected to a voltage input end, a second end of the first switch tube is connected to a voltage output end, and a control end of the first switch tube is connected to a first end of the fourth switch tube by the second resistor;
the first resistor and the first capacitor are connected in parallel between the first end of the first switch tube and the control end of the first switch tube;
a first end of the second switch tube is connected to the voltage input end, and a second end of the second switch tube is connected to the control end of the first switch tube by the third resistor;
a first end of the fourth resistor is connected to the voltage input end, and a second end of the fourth resistor is connected to a control end of the second switch tube;
a first end of the fifth resistor is connected to a first end of the fourth switch tube, and a second end of the fifth resistor is connected to both a first end of the sixth resistor and a control end of the third switch tube;
both a second end of the sixth resistor and a first end of the third switch tube are grounded;
a second end of the third switch tube is connected to the control end of the second switch tube by the seventh resistor; and
a second end of the fourth switch tube is grounded, and a control end of the fourth switch tube receives an over-current signal of the protection chip, so as to protect a post-stage circuit of the voltage output end.

In some embodiments, the first switch tube comprises: a PMOS transistor, a source of the PMOS transistor serves as the first end of the first switch tube, and a drain of the PMOS transistor serves as the second end of the first switch tube.

In some embodiments, the fourth switch tube comprises: an NMOS transistor, a drain of the NMOS transistor serves as the first end of the fourth switch tube, and a source of the NMOS transistor serves as the second end of the fourth switch tube.

In some embodiments, the fourth switch tube comprises: a triode.

In some embodiments, the second switch tube and the third switch tube comprise: triode.

In some embodiments, the protection chip is configured to:
determine whether a bus current of the voltage input end satisfies a preset condition; and
in response to that the bus current of the voltage input end satisfies the preset condition, output the over-current signal to disconnect the fourth switch tube.

Accordingly, the present disclosure further discloses a circuit protection integrated chip, comprising:
an integrated circuit of the soft-start protection circuit according to any one of the above.

BRIEF DESCRIPTION OF THE DRAWINGS

FIG. 1 is a structure distribution diagram of a soft-start protection circuit according to an embodiment of the present disclosure.

DETAILED DESCRIPTION OF THE EMBODIMENTS

Hereinafter, the technical solutions of the present disclosure will be described clearly and thoroughly with reference to the accompanying drawings of the present disclosure. Obviously, the embodiments as described are only some of the embodiments of the present disclosure, and are not all of the embodiments of the present disclosure. All other embodiments obtained by those of ordinary skill in the art on the basis of the embodiments in the present disclosure without creative work shall fall within the scope of protection of the present disclosure.

Embodiment I

In existing soft-start schemes, climbing time of a gate voltage of an MOS transistor is generally controlled by means of RC delay and voltage stabilization, so that the MOS transistor is slowly turned on to achieve the effect of reducing an impulse current. However, this scheme has a risk of mis-operation to some extent. The present disclosure discloses a soft-start protection circuit, which may monitor the voltage of a voltage input end and the voltage of a control end of a first switch tube, so that when there is a change in the two voltages, correct turn-on and turn-off actions may be performed in the soft-start protection circuit, increasing the accuracy of protection and at the same time reducing the turn-on speed of switch tubes to a certain extent, thus effectively reducing the impact of an impulse current on components and systems.

The embodiments of the present disclosure disclose a soft-start protection circuit. As shown in FIG. 1, the circuit comprises: a protection chip C, a first switch tube Q1, a second switch tube Q2, a third switch tube Q3, a fourth switch tube Q4, a first capacitor C1, a first resistor R1, a second resistor R2, a third resistor R3, a fourth resistor R4, a fifth resistor R5, a sixth resistor R6 and a seventh resistor R7, wherein the first switch tube Q1 has a first end connected to a voltage input end VIN, a second end of the first switch tube Q1 is connected to a voltage output end VOUT, and a control end of the first switch tube Q1 is connected to a first end of the fourth switch tube Q4 by the second resistor R2;

the first resistor R1 and the first capacitor C1 are connected in parallel between the first end of the first switch tube Q1 and the control end of the first switch tube Q1;

a first end of the second switch tube is connected to the voltage input end VIN, and a second end of the second switch tube is connected to the control end of the first switch tube Q1 by the third resistor R3;

a first end of the fourth resistor R4 is connected to the voltage input end VIN, and a second end of the fourth resistor R4 is connected to a control end of the second switch tube Q2;

a first end of the fifth resistor R5 is connected to a first end of the fourth switch tube Q4, and a second end of the fifth resistor R5 is connected to both a first end of the sixth resistor R6 and a control end of the third switch tube Q3;

both a second end of the sixth resistor R6 and a first end of the third switch tube Q3 are grounded;

a second end of the third switch tube Q3 is connected to the control end of the second switch tube Q2 by the seventh resistor R7; and a second end of the fourth switch tube Q4 is grounded, and a control end of the fourth switch tube Q4 receives an over-current signal CTL of the protection chip C, so as to protect a post-stage circuit of the voltage output end VOUT.

The protection chip C is configured to:

determine whether a bus current of the voltage input end VIN satisfies a preset condition; and in response to that the bus current of the voltage input end satisfies the preset condition, output the over-current signal CTL to disconnect the fourth switch tube Q4.

Further, for the selection of the switch tubes, the first switch tube Q1 comprises: a PMOS transistor, that is, a power MOS transistor in the prior art; the fourth switch tube Q4 may comprise: an NMOS transistor or a triode; and the second switch tube Q2 and the third switch tube Q3 may comprise: triode, wherein the first switch tube Q1 comprises: a PMOS transistor, a source of the PMOS transistor serves as the first end of the first switch tube Q1, and a drain of the PMOS transistor serves as the second end of the first switch tube Q1.

When the fourth switch tube Q4 comprises an NMOS transistor, a drain of the NMOS transistor serves as the first end of the fourth switch tube Q4, and a source of the NMOS transistor serves as the second end of the fourth switch tube Q4.

The second switch tube Q2 and the third switch tube Q3 comprise triode, wherein the second switch tube Q2 comprises a PNP-type triode, an emitter of the PNP-type triode serves as the first end of the second switch tube Q2, and a collector of the PNP-type triode serves as the second end of the second switch tube Q2. The third switch tube Q3 comprises an NPN-type triode, wherein an emitter of the NPN-type triode serves as the first end of the third switch tube Q3, and a collector of the NPN-type triode serves as the second end of the third switch tube Q3.

In some embodiments, the working process of the soft-start protection circuit is as follows:

When the protection chip C detects that a bus current satisfies a preset condition, an over-current signal CTL is outputted, and the fourth switch tube Q4 is turned off, resulting in that the third switch tube Q3 is turned on, a gate voltage of the second switch tube Q2 is low, a conduction condition is reached, the second switch tube Q2 is turned on, the voltages at two ends of the third resistor R3 are both VIN, the voltages at a gate of the first switch tube Q1 and a source of the first switch tube Q1 do not satisfy the conduction condition, and the first switch tube Q1 is turned off, thereby achieving the effect of protecting a post-stage circuit of a voltage output end VOUT.

When the protection chip C detects that the bus current recovers to be normal, the protection chip C stops outputting the over-current signal CTL, the fourth switch tube Q4 is turned on, the voltage of the second end of the third switch tube Q3 changes from high to low, the third switch tube Q3 is turned off, the voltage of the gate of the second switch tube Q2 is a high level, there is no conduction condition, and the second switch tube Q2 is turned off, as the voltages at the two ends of the first capacitor C1 do not change suddenly, and the voltage gradually reduces to a preset voltage value corresponding to the protection chip C by discharging the first resistor R1, and thus a condition for starting the first switch tube Q1 is reached, the first switch tube Q1 is turned on, and the circuit works normally. In this process, the soft-start protection circuit achieves a soft-start effect.

The embodiments of the present disclosure discloses a soft-start protection circuit, which may monitor the voltage of a voltage input end and the voltage of a control end of a first switch tube, so that when there is a change in the two voltages, correct turn-on and turn-off actions may be performed in the soft-start protection circuit, increasing the accuracy of protection and at the same time reducing the turn-on speed of switch tubes to a certain extent, thus effectively reducing the impact of an impulse current on components and systems.

Embodiment II

Accordingly, the embodiments of the present disclosure further disclose a circuit protection integrated chip, comprising:

an integrated circuit of a soft-start protection circuit according to any one of the embodiments above.

For details of the soft-start protection circuit in the present embodiment, reference may be made to the foregoing embodiment, and details are not repeatedly described herein.

The present embodiment has the same beneficial effects as the foregoing embodiment, and is not further described herein.

Finally, it should be noted that, those skilled in the art should understand that all or a part of the steps of the methods in the foregoing embodiments may be implemented by a program instructing relevant hardware. The program may be stored in a computer readable storage unit. The storage unit described in all embodiments of the present disclosure includes a read-only memory, a random access memory, a magnetic disk, etc.

As used herein, terms such as "comprising", "including" or any other variants are intended to cover the non-exclusive including, thereby making that the process, method, merchandise, or device comprising a series of elements comprise not only those elements but also other elements that are not listed explicitly or the elements inherent to the process, method, merchandise, or device. Without further limitation, an element defined by a sentence "comprising a . . . " does not exclude other same elements existing in a process, method, merchandise or device that includes elements.

The embodiments in the present description are described in a progressive manner. Each embodiment focuses on differences from other embodiments. For the same similar parts among the embodiments, reference may be made to each other.

The descriptions of the disclosed embodiments enable those skilled in the art to implement or use the present disclosure. Various modifications to these embodiments will be readily apparent to those skilled in the art. The general principles defined herein may be implemented in other embodiments, without departing from the spirit or scope of the present disclosure. Therefore, the present disclosure will not be limited to the embodiments described herein, but should be in accordance with the broadest scope consistent with the principle and novel features disclosed herein.

What is claimed is:

1. A soft-start protection circuit, comprising a protection chip, a first switch tube, a second switch tube, a third switch tube, a fourth switch tube, a first capacitor, a first resistor, a second resistor, a third resistor, a fourth resistor, a fifth resistor, a sixth resistor and a seventh resistor, wherein
   the first switch tube has a first end connected to a voltage input end, a second end of the first switch tube is connected to a voltage output end, and a control end of the first switch tube is connected to a first end of the fourth switch tube by the second resistor;
   the first resistor and the first capacitor are connected in parallel between the first end of the first switch tube and the control end of the first switch tube;
   a first end of the second switch tube is connected to the voltage input end, and a second end of the second switch tube is connected to the control end of the first switch tube by the third resistor;
   a first end of the fourth resistor is connected to the voltage input end, and a second end of the fourth resistor is connected to a control end of the second switch tube;
   a first end of the fifth resistor is connected to a first end of the fourth switch tube, and a second end of the fifth resistor is connected to both a first end of the sixth resistor and a control end of the third switch tube;
   both a second end of the sixth resistor and a first end of the third switch tube are grounded;
   a second end of the third switch tube is connected to the control end of the second switch tube by the seventh resistor; and
   a second end of the fourth switch tube is grounded, and a control end of the fourth switch tube receives an over-current signal of the protection chip, so as to protect a post-stage circuit of the voltage output end;
   wherein the third switch tube comprises: an NPN-type triode, wherein an emitter of the NPN-type triode serves as the first end of the third switch tube, and a collector of the NPN-type triode serves as the second end of the third switch tube;
   wherein the working process of the soft-start protection circuit comprises: when the protection chip detects that the bus current recovers to be normal, the protection chip stops outputting the over-current signal CTL, the fourth switch tube is turned on, the voltage of the second end of the third switch tube changes from high to low, the third switch tube is turned off, the voltage of the gate of the second switch tube is a high level, there is no conduction condition, and the second switch tube is turned off, as the voltages at the two ends of the first capacitor do not change suddenly, and the voltage gradually reduces to a preset voltage value corresponding to the protection chip by discharging the first resistor, and thus a condition for starting the first switch tube is reached, the first switch tube is turned on, and the circuit works normally.

2. The soft-start protection circuit as claimed in claim 1, wherein the first switch tube comprises: a PMOS transistor, a source of the PMOS transistor serves as the first end of the first switch tube, and a drain of the PMOS transistor serves as the second end of the first switch tube.

3. The soft-start protection circuit as claimed in claim 2, wherein the fourth switch tube comprises: an NMOS transistor, a drain of the NMOS transistor serves as the first end of the fourth switch tube, and a source of the NMOS transistor serves as the second end of the fourth switch tube.

4. The soft-start protection circuit as claimed in claim 2, wherein the fourth switch tube comprises: a triode.

5. The soft-start protection circuit as claimed in claim 1, wherein the second switch tube and the third switch tube comprise: triode.

6. The soft-start protection circuit as claimed in claim 1, wherein the protection chip is configured to:
   determine whether a bus current of the voltage input end satisfies a preset condition; and
   in response to that the bus current of the voltage input end satisfies the preset condition, output the over-current signal to disconnect the fourth switch tube.

7. The soft-start protection circuit as claimed in claim 1, wherein the second switch tube comprises: a PNP-type triode, an emitter of the PNP-type triode serves as the first end of the second switch tube, and a collector of the PNP-type triode serves as the second end of the second switch tube.

8. The soft-start protection circuit as claimed in claim 1, wherein the working process of the soft-start protection circuit comprises:
   when the protection chip detects that a bus current satisfies a preset condition, an over-current signal CTL is outputted, and the fourth switch tube is turned off, resulting in that the third switch tube is turned on, a gate voltage of the second switch tube is low, a conduction condition is reached, the second switch tube is turned on, the voltages at two ends of the third resistor are both VIN, the voltages at a gate of the first switch tube and a source of the first switch tube do not satisfy the conduction condition, and the first switch tube is turned off, thereby achieving the effect of protecting a post-stage circuit of a voltage output end VOUT.

9. A circuit protection integrated chip, comprising:
   a integrated circuit of the soft-start protection circuit, wherein the soft-start protection circuit comprises:
   a protection chip, a first switch tube, a second switch tube, a third switch tube, a fourth switch tube, a first capacitor, a first resistor, a second resistor, a third resistor, a fourth resistor, a fifth resistor, a sixth resistor and a seventh resistor, wherein
   the first switch tube has a first end connected to a voltage input end, a second end of the first switch tube is connected to a voltage output end, and a control end of the first switch tube is connected to a first end of the fourth switch tube by the second resistor;

the first resistor and the first capacitor are connected in parallel between the first end of the first switch tube and the control end of the first switch tube;

a first end of the second switch tube is connected to the voltage input end, and a second end of the second switch tube is connected to the control end of the first switch tube by the third resistor;

a first end of the fourth resistor is connected to the voltage input end, and a second end of the fourth resistor is connected to a control end of the second switch tube;

a first end of the fifth resistor is connected to a first end of the fourth switch tube, and a second end of the fifth resistor is connected to both a first end of the sixth resistor and a control end of the third switch tube;

both a second end of the sixth resistor and a first end of the third switch tube are grounded;

a second end of the third switch tube is connected to the control end of the second switch tube by the seventh resistor; and a second end of the fourth switch tube is grounded, and a control end of the fourth switch tube receives an over-current signal of the protection chip, so as to protect a post-stage circuit of the voltage output end;

wherein the working process of the soft-start protection circuit comprises: when the protection chip detects that the bus current recovers to be normal, the protection chip stops outputting the over-current signal CTL, the fourth switch tube is turned on, the voltage of the second end of the third switch tube changes from high to low, the third switch tube is turned off, the voltage of the gate of the second switch tube is a high level, there is no conduction condition, and the second switch tube is turned off, as the voltages at the two ends of the first capacitor do not change suddenly, and the voltage gradually reduces to a preset voltage value corresponding to the protection chip by discharging the first resistor, and thus a condition for starting the first switch tube is reached, the first switch tube is turned on, and the circuit works normally;

wherein the working process of the soft-start protection circuit comprises: when the protection chip detects that a bus current satisfies a preset condition, an over-current signal CTL is outputted, and the fourth switch tube is turned off, resulting in that the third switch tube is turned on, a gate voltage of the second switch tube is low, a conduction condition is reached, the second switch tube is turned on, the voltages at two ends of the third resistor are both VIN, the voltages at a gate of the first switch tube and a source of the first switch tube do not satisfy the conduction condition, and the first switch tube is turned off, thereby achieving the effect of protecting a post-stage circuit of a voltage output end VOUT.

10. The circuit protection integrated chip as claimed in claim 9, wherein the first switch tube comprises: a PMOS transistor, a source of the PMOS transistor serves as the first end of the first switch tube, and a drain of the PMOS transistor serves as the second end of the first switch tube.

11. The circuit protection integrated chip as claimed in claim 10, wherein the fourth switch tube comprises: an NMOS transistor, a drain of the NMOS transistor serves as the first end of the fourth switch tube, and a source of the NMOS transistor serves as the second end of the fourth switch tube.

12. The circuit protection integrated chip as claimed in claim 10, wherein the fourth switch tube comprises: a triode.

13. The circuit protection integrated chip as claimed in claim 9, wherein the second switch tube and the third switch tube comprise: triode.

14. The circuit protection integrated chip as claimed in claim 9, wherein the protection chip is configured to:
  determine whether a bus current of the voltage input end satisfies a preset condition; and
  in response to that the bus current of the voltage input end satisfies the preset condition, output the over-current signal to disconnect the fourth switch tube.

15. The circuit protection integrated chip as claimed in claim 9, wherein the second switch tube comprises: a PNP-type triode, an emitter of the PNP-type triode serves as the first end of the second switch tube, and a collector of the PNP-type triode serves as the second end of the second switch tube.

16. The circuit protection integrated chip as claimed in claim 9, wherein the third switch tube comprises: an NPN-type triode, wherein an emitter of the NPN-type triode serves as the first end of the third switch tube, and a collector of the NPN-type triode serves as the second end of the third switch tube.

* * * * *